US010830497B2

(12) United States Patent
Krause et al.

(10) Patent No.: US 10,830,497 B2
(45) Date of Patent: Nov. 10, 2020

(54) CERAMIC PARTICLES FOR USE IN A SOLAR POWER TOWER

(71) Applicant: CARBO CERAMICS INC., Houston, TX (US)

(72) Inventors: Claude Krause, Saint Martinville, LA (US); Benjamin Eldred, Houston, TX (US); Steve Canova, Macon, GA (US)

(73) Assignee: CARBO CERAMICS INC., Houston, TX (US)

( * ) Notice: Subject to any disclaimer, the term of this patent is extended or adjusted under 35 U.S.C. 154(b) by 0 days.

(21) Appl. No.: 16/167,317

(22) Filed: Oct. 22, 2018

(65) Prior Publication Data
US 2019/0056150 A1 Feb. 21, 2019

Related U.S. Application Data

(63) Continuation of application No. 15/370,978, filed on Dec. 6, 2016, now Pat. No. 10,107,523.

(Continued)

(51) Int. Cl.
C04B 35/64 (2006.01)
F24S 70/16 (2018.01)
(Continued)

(52) U.S. Cl.
CPC .............. F24S 70/16 (2018.05); C04B 33/04 (2013.01); C04B 35/1115 (2013.01); C04B 35/14 (2013.01); C04B 35/18 (2013.01); C04B 35/486 (2013.01); C04B 35/565 (2013.01); C04B 35/587 (2013.01); C04B 35/62204 (2013.01);
(Continued)

(58) Field of Classification Search
CPC .... C04B 2235/3201; C04B 2235/3206; C04B 2235/3208; C04B 2235/3224; C04B 2235/3232; C04B 2235/3262; C04B 2235/3272; C04B 2235/3463; C04B 2235/528; C04B 2235/5427; C04B 2235/5436; C04B 2235/5481;
(Continued)

(56) References Cited

U.S. PATENT DOCUMENTS 4,082,082 A * 4/1978 Harvey ................. F24S 10/502
126/665
4,427,068 A * 1/1984 Fitzgibbon ............ E21B 43/267
166/280.2

(Continued)

FOREIGN PATENT DOCUMENTS

WO 2015138990 A1 9/2015

OTHER PUBLICATIONS

International Search Report and Written Opinion in International application No. PCT/US16/65244 dated Mar. 9, 2017.

(Continued)

Primary Examiner — Noah S Wiese
(74) Attorney, Agent, or Firm — Patterson + Sheridan, LLP

(57) ABSTRACT

Ceramic particles for use in a solar power tower and methods for making and using the ceramic particles are disclosed. The ceramic particle can include a sintered ceramic material formed from a mixture of a ceramic raw material and a darkening component comprising MnO as $Mn^{2+}$. The ceramic particle can have a size from about 8 mesh to about 170 mesh and a density of less than 4 g/cc.

19 Claims, 4 Drawing Sheets

Related U.S. Application Data

(60) Provisional application No. 62/264,010, filed on Dec. 7, 2015.

(51) Int. Cl.

| | |
|---|---|
| *C04B 35/628* | (2006.01) |
| *C04B 35/63* | (2006.01) |
| *F24S 80/20* | (2018.01) |
| *F24S 20/20* | (2018.01) |
| *C04B 33/04* | (2006.01) |
| *C04B 35/111* | (2006.01) |
| *C04B 35/486* | (2006.01) |
| *C04B 35/18* | (2006.01) |
| *C04B 35/565* | (2006.01) |
| *C04B 35/622* | (2006.01) |
| *C04B 35/587* | (2006.01) |
| *C04B 35/14* | (2006.01) |

(52) U.S. Cl.
CPC .. *C04B 35/62805* (2013.01); *C04B 35/62884* (2013.01); *C04B 35/62886* (2013.01); *C04B 35/63* (2013.01); *C04B 35/64* (2013.01); *F24S 20/20* (2018.05); *F24S 80/20* (2018.05); *C04B 2235/3262* (2013.01); *C04B 2235/3265* (2013.01); *C04B 2235/3267* (2013.01); *C04B 2235/3272* (2013.01); *C04B 2235/6023* (2013.01); *C04B 2235/77* (2013.01); *C04B 2235/95* (2013.01); *Y02E 10/41* (2013.01)

(58) Field of Classification Search
CPC ...... C04B 2235/606; C04B 2235/6567; C04B 2235/72; C04B 2235/727
See application file for complete search history.

(56) References Cited

U.S. PATENT DOCUMENTS

| | | | |
|---|---|---|---|
| 4,737,477 A * | 4/1988 | Cao | C03C 1/04 |
| | | | 501/132 |
| 7,160,825 B2 | 1/2007 | Etoh et al. | |
| 8,109,265 B1 | 2/2012 | Kolb | |
| 8,614,001 B2 | 12/2013 | Nonnet et al. | |
| 8,614,157 B2 | 12/2013 | Pope et al. | |
| 8,865,386 B2 * | 10/2014 | Kawauchi | G03G 9/107 |
| | | | 430/111.3 |
| 8,865,631 B2 | 10/2014 | Eldred et al. | |
| 8,915,243 B2 * | 12/2014 | Martinez-Val Penalosa | ............... |
| | | | F24S 80/60 |
| | | | 126/651 |
| 2011/0195877 A1 | 8/2011 | Adderson | |
| 2012/0241157 A1 | 9/2012 | Pope et al. | |
| 2014/0242511 A1 * | 8/2014 | Kawauchi | C04B 35/2633 |
| | | | 430/111.33 |

OTHER PUBLICATIONS

Non-Final Office Action dated Oct. 27, 2019 U.S. Appl. No. 15/370,978.
Extended European Search Report dated Sep. 27, 2019 for Application No. 16873704.7.

* cited by examiner

CERAMIC PARTICLES FOR USE IN A SOLAR POWER TOWER

CROSS-REFERENCE TO RELATED APPLICATIONS

This application is a Continuation of U.S. non-provisional patent application Ser. No. 15/370,978 filed Dec. 6, 2016, which claims the benefit of U.S. patent application Ser. No. 62/264,010, filed Dec. 7, 2015. The aforementioned related patent applications are herein incorporated by reference in their entirety.

FIELD

Embodiments of the present disclosure relate generally to ceramic particles, and more particularly to ceramic particles used in solar power towers.

BACKGROUND

Solar power towers are towers used to receive focused sunlight reflected by a plurality of movable mirrors, or heliostats, such as those located in a heliostat solar power plant. These towers oftentimes contain solar absorption media such as falling liquids, ceramic particles, or sand that can capture the reflected sunlight in the form of thermal energy. The thermal energy contained in the solar absorption media is then used to generate electricity. In many cases, the thermal energy contained in the solar absorption media is transferred to water to generate steam used to drive turbines which produce electricity resulting in cooled solar absorption media. The cooled solar absorption media is typically recycled for repeated exposure to the reflected sunlight in the solar power tower.

It has been found that dark ceramic particles tend to enhance solar energy absorption properties. However, it has also been found that as these dark particles are repeatedly exposed to elevated solar temperatures, which can exceed 500° C., they become lighter in color and as a result lose some of their solar absorption capacity. There is a need, therefore, for ceramic particles that can maintain their solar absorption capacity after repeated exposure to solar energy.

BRIEF DESCRIPTION OF THE DRAWINGS

The present disclosure may best be understood by referring to the following description and accompanying drawings that are used to illustrate embodiments of the present disclosure. In the drawings.

DETAILED DESCRIPTION

Figure 1:
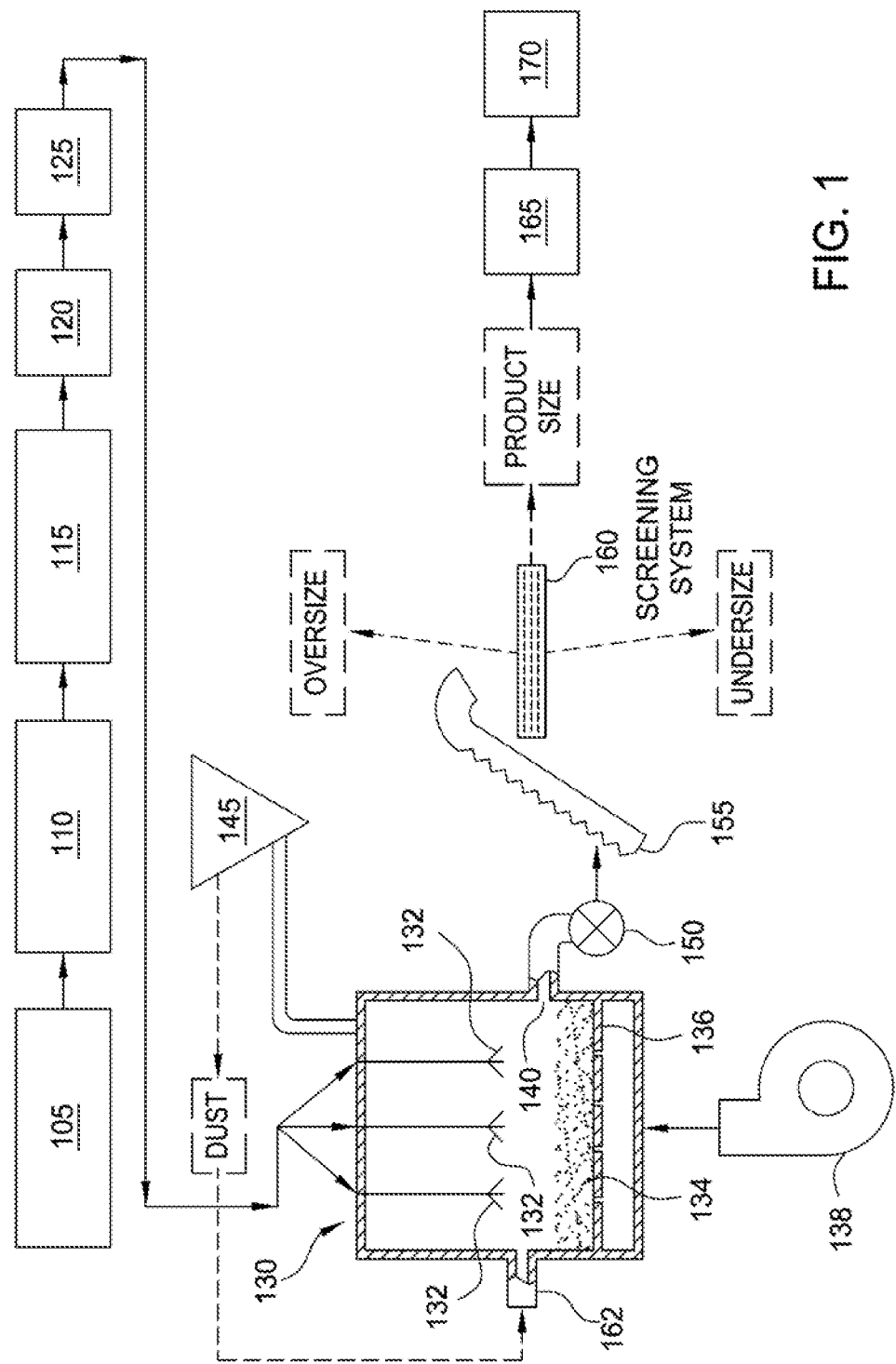
FIG. 1 is a schematic illustration of a system for preparing ceramic particles from a slurry as described herein.

In the following description, numerous specific details are set forth. However, it is understood that embodiments of the present disclosure may be practiced without these specific details. In other instances, well-known structures and techniques have not been shown in detail in order not to obscure the understanding of this description.

Described herein are ceramic particles capable of absorbing solar radiation. In particular, ceramic particles for use in solar power towers are described herein. Also described herein are methods for making ceramic particles having an increased solar absorption capacity. In particular, methods of incorporating manganese oxide into ceramic particles are described herein. Also described herein are methods of using ceramic particles in a solar power tower.

The ceramic particles disclosed herein can be or include darkened ceramic particles. The darkened ceramic particles can have a darkening component. The darkening component can be or include any colorant material suitable for darkening the ceramic particles. The darkening component can be or include any one or more metal oxides suitable for darkening the ceramic particles. In one or more exemplary embodiments, the darkening component can be or include one or more transition metal oxides. For example, the darkening component can be or include one or more oxides of iron, cobalt, manganese, magnesium, nickel, molybdenum, or tungsten. In one or more exemplary embodiments, the darkening component can be or include iron oxide and/or manganese oxide. In one or more exemplary embodiments, manganese oxide can be selected from one or more of MnO, $Mn_2O_3$, and $MnO_2$ and any mixture thereof. For example, the darkening component can be manganese oxide in the $Mn^{2+}$ state (MnO) and/or manganese oxide in the $Mn^{3+}$ state ($Mn_2O_3$).

In has also been found that iron oxide in the $Fe^{2+}$ state (FeO), which is a dark colored compound, can lighten when exposed to elevated temperatures, such as those present in the solar power tower. In has also been found that MnO, which is a light colored compound, can darken when exposed to the elevated temperatures present in the solar power tower. For example, upon thermal exposure in air, iron and manganese can oxidize from $2^+$ to $3^+$. The shift from $Fe^{2+}$ to $Fe^{3+}$ (FeO to $Fe_2O_3$) lightens the Fe component and thus can lighten the coloration of the ceramic particles containing the Fe component. In contrast, the shift from $Mn^{2+}$ to $Mn^{3+}$ (MnO to $Mn_2O_3$) darkens the Mn component and can darken the coloration of the ceramic particles containing the Mn component.

The darkening component can be added to or incorporated into the ceramic particle in any suitable manner. In one or more exemplary embodiments, the darkening component can be added to a sintered ceramic particle, during any stage in a manufacturing process used to produce the ceramic particle, or to raw materials used to produce the ceramic particle, or any combination thereof. In one or more exemplary embodiments, manganese oxide can be combined with any suitable raw ceramic feedstock prior to being introduced to a manufacturing process suitable to produce the ceramic particles. Suitable raw ceramic feedstocks can include, but are not limited to, alumina, silica, zirconia, zinc oxide, silicon nitride, silicon carbide, fly ash, and naturally occurring clays, such as kaolin and/or bauxite, and the like and any combinations thereof. Suitable manufacturing process include, but are not limited to, continuous spray atomization, spray fluidization, drip casting, spray drying, or compression. Suitable ceramic particles and methods for manufacture are disclosed in U.S. Pat. Nos. 4,068,718, 4,427,068, 5,188,175, 7,036,591, 8,865,631, 8,883,693, and 9,175,210, and U.S. patent application Ser. Nos. 14/502,483 and 14/802,761, the entire disclosures of which are incorporated herein by reference, the entire disclosures of which are incorporated herein by reference.

In one or more exemplary embodiments, the darkening component can be added to a ceramic particle in its method of manufacture. The ceramic particles can be made according to a method as described in U.S. Pat. No. 4,879,181, the entire disclosure of which is incorporated herein by reference. The ceramic raw material can be initially calcined in a calciner by any suitable calcining method at temperatures and times sufficiently high to remove organic material and to substantially remove water of hydration. The calcined ceramic raw material can be added in a predetermined ratio to a high intensity mixer. In one or more exemplary embodiments, at least about 40% of the ceramic raw material on a dry weight basis is clay. The calcined ceramic raw material can have an average particle size of less than about 15 microns, less than about 10 microns, less than about 5 microns, or between about 3 microns and 0.5 microns.

The calcined ceramic raw material can be stirred to form a dry homogeneous particulate mixture having an average particle size of less than about 15 microns. A suitable stirring or mixing device is that obtainable from Eirich Machines, Inc., known as the Eirich Mixer. A mixer of this type can be provided with a horizontal or inclined circular table, which can be made to rotate at a speed of from about 10 to about 60 revolutions per minute (rpm), and can be provided with a rotatable impacting impeller, which can be made to rotate at a tip speed of from about 5 to about 50 meters per second. The direction of rotation of the table can be opposite that of the impeller, causing material added to the mixer to flow over itself in countercurrent manner. The central axis of the impacting impeller can be located within the mixer at a position off center from the central axis of the rotatable table. The table can be in a horizontal or inclined position, wherein the incline, if any, can be between 0 and 35 degrees from the horizontal.

While the mixture is being stirred, a suitable amount of water can be added to cause formation of composite, spherical pellets from the ceramic powder mixture. The total quantity of water sufficient to cause essentially spherical pellets to form can be from about 17 to about 20 wt % of the calcined ceramic raw material. The total mixing time can be from about 2 to about 6 minutes.

After the clay mixture is added to the mixer, the table can be rotated at from about 10 to about 60 rpm or from about 20 to about 40 rpm, and the impacting impeller can be rotated to obtain a tip speed of from about 25 to about 50 or from about 25 to about 35, meters per second, and sufficient water can be added to cause essentially spherical pellets of the desired size to form. If desired, the impeller can be initially rotated at from about 5 to about 20 meters per second during addition of one-half of the sufficient water and subsequently rotated at the higher tip speed of 25 to about 50 meters per second during the addition of the balance of the water. The rate of water addition is not critical. The intense mixing action can quickly disperse the water throughout the particles.

The resulting pellets can be dried at a temperature of between about 100° C. (212° F.) and about 300° C. (572° F.) until less than 3 percent or less than 1 percent moisture remains in the pellets. For example, the drying temperature can be between about 175° C. (347° F.) and 275° C. (527° F.), and the drying time can be between about 30 and about 60 minutes.

The dried pellets can then be furnaced at a sintering temperature for a period sufficient to enable recovery of the ceramic particles. The specific time and temperature to be employed can be dependent on the starting ingredients and can be determined empirically according to the results of physical testing of ceramic particles after furnacing. Furnacing can be carried out to sinter the composite pellets; generally, temperatures of between about 1,250° C. and about 1,550° C. for about 4 to about 20 minutes or from about 1,400° C. to about 1,515° C. for about 4 to about 8 minutes.

The darkening component can be added at any suitable stage in the method described above. In one or more exemplary embodiments, the darkening component can be introduced at any location prior to, on, or after, the calciner and/or the Eirich Mixer to provide the ceramic particle.

Referring now to FIG. 1, an exemplary system for implementing a continuous process for preparing sintered, substantially round and spherical particles from a slurry is illustrated. The exemplary system illustrated in FIG. 1 is similar in configuration and operation to that described in U.S. Pat. No. 4,440,866, the entire disclosure of which is incorporated herein by reference.

In the system illustrated in FIG. 1, a ceramic raw material is passed through a shredder 105 which slices and breaks apart the raw material into small chunks. The ceramic raw material can have any suitable alumina content. For example, the ceramic raw material can have an alumina content of about 10 wt %, about 20 wt %, about 30 wt %, or about 40 wt % to about 50 wt %, about 60 wt %, about 70 wt %, about 80 wt %, about 90 wt %, or about 95 wt % or more. In some embodiments, when the raw material as mined, or as received, (referred to herein as "untreated" raw material) is of such consistency that it can be processed as described herein without shredding, the shredder may be bypassed. Raw material fed through a shredder such as is illustrated in FIG. 1, is referred to as "treated" raw material.

In certain embodiments, the shredder breaks apart and slices the raw material so as to yield pieces having a diameter of less than about five inches, although pieces having smaller and larger diameters can be further processed into a slurry as described herein. Shredders and numerous other devices for slicing, chopping or comminuting the raw material, as well as commercial sources for same, such as the Gleason Foundry Company, are well-known to those of ordinary skill in the art.

The treated or untreated raw material and water are fed to a blunger 110, which has a rotating blade that imparts a shear force to and further reduces the particle size of the raw material to form a slurry. In a continuous process, the raw material and water are continuously fed to the blunger. Blungers and similar devices for making slurries of such materials, as well as commercial sources for same are well-known to those of ordinary skill in the art.

In certain embodiments, the darkening component is added to the raw material and water in the blunger 110 to result in a darkening component concentration of about 1 ppm, about 10 ppm, about 50 ppm, about 0.01%, about 0.05%, about 0.1%, about 0.5%, or about 1% to about 2%, about 3%, about 5%, about 7.5%, about 10%, about 15%, or about 20% or more by weight of the solids content in the slurry or just prior to the formation of pellets as described below.

A sufficient amount of water is added to the blunger 110 to result in a slurry having a solids content in the range of from about 40% to about 60% by weight. In certain embodiments, a sufficient amount of water is added to the slurry such that the solids content of the slurry is from about 45% to about 55% by weight. In still other embodiments, a sufficient amount of water is added to the slurry such that the solids content of the slurry is about 50% by weight. The water added to the blunger 110 can be fresh water or deionized water. In a continuous process for preparing the slurry, the solids content of the slurry is periodically analyzed and the amount of water fed to the slurry adjusted to maintain the desired solids content. Methods for analyzing the solids content of a slurry and adjusting a feed of water are well-known and understood by those of ordinary skill in the art.

In certain embodiments, a dispersant is added to the slurry in the blunger 110 to adjust the viscosity of the slurry to a target range as discussed further below. In other embodiments, the viscosity of the slurry in the blunger 110 is adjusted to the target range by the addition of a dispersant and a pH-adjusting reagent.

A dispersant may be added to the slurry prior to the addition of the darkening material or other additives. In certain embodiments, the composition includes a dispersant in an amount of from about 0.15% to about 0.30% by weight based on the dry weight of the raw material.

Exemplary materials suitable for use as a dispersant in the compositions and methods described herein include but are not limited to sodium polyacrylate, ammonium polyacrylate, ammonium polymethacrylate, tetra sodium pyrophosphate, tetra potassium pyrophosphate, polyphosphate, ammonium polyphosphate, ammonium citrate, ferric ammonium citrate, and polyelectrolytes such as a composition of ammonium polymethacrylate and water commercially available from a variety of sources, such as, Kemira Chemicals under the trade name C-211, Phoenix Chemicals, Bulk Chemical Systems under the trade name BCS 4020 and R.T. Vanderbilt Company, Inc. under the trade name DARVAN C. Generally, the dispersant can be any material that will adjust the viscosity of the slurry to a target viscosity such that the slurry can be subsequently processed through one or more pressure nozzles of a fluidizer. In certain embodiments, the target viscosity is less than 150 centipoises (cps) (as determined on a Brookfield Viscometer with a #61 spindle). In other embodiments, the target viscosity is less than 100 cps.

According to embodiments in which a pH-adjusting reagent is used, a sufficient amount of a pH-adjusting reagent is added to the slurry to adjust the pH of the slurry to a range of from about 8 to about 11. In certain embodiments, a sufficient amount of the pH-adjusting reagent is added to the slurry to adjust the pH to about 9, about 9.5, about 10 or about 10.5. The pH of the slurry can be periodically analyzed by a pH meter, and the amount of pH-adjusting reagent fed to the slurry adjusted to maintain a desired pH. Methods for analyzing the pH of a slurry and adjusting the feed of the pH-adjusting reagent are within the ability of those of ordinary skill in the art. Exemplary materials suitable for use as a pH-adjusting reagent in the compositions and methods described herein include but are not limited to ammonia and sodium carbonate.

Generally, the target viscosity of the compositions is a viscosity that can be processed through a given type and size of pressure nozzle in a fluidizer, without becoming clogged. Generally, the lower the viscosity of the slurry, the more easily it can be processed through a given fluidizer. However, the addition of too much dispersant can cause the viscosity of the slurry to increase to a point that it cannot be satisfactorily processed through a given fluidizer. One of ordinary skill in the art can determine the target viscosity for given fluidizer types through routine experimentation.

The blunger 110 can mix the raw material, darkening component, water, dispersant and pH-adjusting reagent until a slurry is formed. The length of time required to form a slurry is dependent on factors such as the size of the blunger, the speed at which the blunger is operating, and the amount of material in the blunger.

From the blunger 110, the slurry is fed to a tank 115, where the slurry is continuously stirred, and a binder is added in an amount of from about 0.2% to about 5.0% by weight, based on the total dry weight of the raw material and the darkening component. In certain embodiments, the binder is added in an amount of from about 0.2% to about 3.0% by weight based on the total dry weight of the raw material and the darkening component. Suitable binders include but are not limited to polyvinyl acetate, polyvinyl alcohol (PVA), methylcellulose, dextrin, pregelatanized corn starch, pregelatanized potato starch, and molasses. In certain embodiments, the binder is PVA having a molecular weight of from about 20,000 to 100,000 $M_n$. "$M_n$" represents the number average molecular weight which is the total weight of the polymeric molecules in a sample, divided by the total number of polymeric molecules in that sample.

The tank 115 maintains the slurry created by the blunger 110. However, the tank 115 stirs the slurry with less agitation than the blunger, so as to mix the binder with the slurry without causing excessive foaming of the slurry or increasing the viscosity of the slurry to an extent that would prevent the slurry from being fed through the pressurized nozzles of a fluidizer.

In another embodiment, the binder can be added to the slurry while in the blunger. In this embodiment, the blunger optionally has variable speeds, including a high speed to achieve the high intensity mixing for breaking down the raw material into a slurry form, and a low speed to mix the binder with the slurry without causing the above-mentioned excessive foaming or increase in viscosity.

Referring again to the tank 115 illustrated in FIG. 1, the slurry is stirred in the tank, after addition of the binder, for a time sufficient to thoroughly mix the binder with the slurry. In certain embodiments, the slurry is stirred in the tank for up to about 30 minutes following the addition of binder. In other embodiments, the slurry is stirred in the tank 115 for at least about 30 minutes. In still other embodiments, the slurry is stirred in the tank for more than about 30 minutes after addition of the binder.

Tank 115 can also be a tank system comprised of one, two, three or more tanks. Any configuration or number of tanks that enables the thorough mixing of the binder with the slurry is sufficient. In a continuous process, water, and one or more of dust, oversized particles, or undersized particles from a subsequent fluidizer or other apparatus can be added to the slurry in the tank 115. From the tank 115, the slurry is fed to a heat exchanger 120, which heats the slurry to a temperature of from about 25° C. to about 90° C. From the heat exchanger 120, the slurry is fed to a pump system 125, which feeds the slurry, under pressure, to a fluidizer 130.

A grinding mill(s) and/or a screening system(s) (not illustrated) can be inserted at one or more places in the system illustrated in FIG. 1 prior to feeding the slurry to the fluidizer to assist in breaking any larger-sized raw material down to a target size suitable for feeding to the fluidizer. In certain embodiments, the target size is less than 230 mesh. In other embodiments, the target size is less than 325 mesh, less than 270 mesh, less than 200 mesh or less than 170 mesh. The target size is influenced by the ability of the type and/or size of the pressure nozzle in the subsequent fluidizer to atomize the slurry without becoming clogged.

If a grinding system is employed, it is charged with a grinding media suitable to assist in breaking the raw material down to a target size suitable for subsequent feeding through one or more pressure nozzles of a fluidizer. If a screening system is employed, the screening system is designed to remove particles larger than the target size from the slurry. For example, the screening system can include one or more screens, which are selected and positioned so as to screen the slurry to particles that are smaller than the target size.

Referring again to FIG. 1, fluidizer 130 is of conventional design, such as described in, for example, U.S. Pat. No. 3,533,829 and U.K. Pat. No. 1,401,303. Fluidizer 130 includes at least one atomizing nozzle 132 (three atomizing nozzles 132 being shown in FIG. 1), which is a pressure nozzle of conventional design. In other embodiments, one or more two-fluid nozzles are suitable. The design of such nozzles is well known, for example from K. Masters: "Spray Drying Handbook", John Wiley and Sons, New York (1979).

Fluidizer 130 further includes a particle bed 134, which is supported by a plate 136, such as a perforated, straight or directional plate. Hot air flows through the plate 136. The particle bed 134 comprises seeds from which green pellets of a target size can be grown. The term "green pellets" and related forms, as used herein, refers to substantially round and spherical particles which have been formed from the slurry but are not sintered. When a perforated or straight plate is used, the seeds also serve to obtain plug flow in the fluidizer. Plug flow is a term known to those of ordinary skill in the art, and can generally be described as a flow pattern where very little back mixing occurs. The seed particles are smaller than the target size for green pellets made according to the present methods. In certain embodiments, the seed comprises from about 5% to about 20% of the total volume of a green pellet formed therefrom. Slurry is sprayed, under pressure, through the atomizing nozzles 132, and the slurry spray coats the seeds to form green pellets that are substantially round and spherical.

External seeds can be placed on the perforated plate 136 before atomization of the slurry by the fluidizer begins. If external seeds are used, the seeds can be prepared in a slurry process similar to that illustrated in FIG. 1, where the seeds are simply taken from the fluidizer at a target seed size. External seeds can also be prepared in a high intensity mixing process such as that described in U.S. Pat. No. 4,879,181, the entire disclosure of which is hereby incorporated by reference.

According to certain embodiments, external seeds are made from either a raw material having at least the same alumina content as the raw material used to make the slurry, or from a raw material having more or less alumina than the raw material used to make the slurry. In certain embodiments, the slurry has an alumina content that is at least 10%, at least 20%, or at least 30% less than that of the seeds. In other embodiments, the external seeds have an alumina content less than that of the slurry, such as at least 10%, at least 20%, or at least 30% less than that of the slurry.

Alternatively, seeds for the particle bed are formed by the atomization of the slurry, thereby providing a method by which the slurry "self-germinates" with its own seed. According to one such embodiment, the slurry is fed through the fluidizer 130 in the absence of a seeded particle bed 134. The slurry droplets exiting the nozzles 132 solidify, but are small enough initially that they get carried out of the fluidizer 130 by air flow and caught as "dust" (fine particles) by a dust collector 145, which may, for instance, be an electrostatic precipitator, a cyclone, a bag filter, a wet scrubber or a combination thereof. The dust from the dust collector is then fed to the particle bed 134 through dust inlet 162, where it is sprayed with slurry exiting the nozzles 132. The dust may be recycled a sufficient number of times, until it has grown to a point where it is too large to be carried out by the air flow and can serve as seed. The dust can also be recycled to another operation in the process, for example, the tank 115.

Referring again to FIG. 1, hot air is introduced to the fluidizer 130 by means of a fan and an air heater, which are schematically represented at 138. The velocity of the hot air passing through the particle bed 134 is from about 0.9 meters/second to about 1.5 meters/second, and the depth of the particle bed 134 is from about 2 centimeters to about 60 centimeters. The temperature of the hot air when introduced to the fluidizer 130 is from about 250° C. to about 650° C. The temperature of the hot air as it exits from the fluidizer 130 is less than about 250° C., and in some embodiments is less than about 100° C.

The distance between the atomizing nozzles 132 and the plate 136 is configured to avoid the formation of dust which occurs when the nozzles 132 are too far away from the plate 126 and the formation of irregular, coarse particles which occurs when the nozzles 132 are too close to the plate 136. The position of the nozzles 132 with respect to the plate 136 is adjusted on the basis of an analysis of powder sampled from the fluidizer 130.

The green pellets formed by the fluidizer accumulate in the particle bed 134. In a continuous process, the green pellets formed by the fluidizer 130 are withdrawn through an outlet 140 in response to the level of product in the particle bed 134 in the fluidizer 130, so as to maintain a given depth in the particle bed. A rotary valve 150 conducts green pellets withdrawn from the fluidizer 130 to an elevator 155, which feeds the green pellets to a screening system 160, where the green pellets are separated into one or more fractions, for example, an oversized fraction, a product fraction, and an undersized fraction.

The oversized fraction exiting the screening unit 160 includes those green pellets that are larger than the desired product size. In a continuous process, the oversized green pellets may be recycled to tank 115, where at least some of the oversized green pellets can be broken down and blended with slurry in the tank. Alternatively, oversized green pellets can be broken down and recycled to the particle bed 134 in the fluidizer 130. The undersized fraction exiting the screening system 160 includes those green pellets that are smaller than the desired product size. In a continuous process, these green pellets may be recycled to the fluidizer 130, where they can be fed through an inlet 162 as seeds or as a secondary feed to the fluidizer 130.

The product fraction exiting the screening system 160 includes those green pellets having the desired product size. These green pellets are sent to a pre-sintering device 165, for example, a calciner, where the green pellets are dried or calcined prior to sintering. In certain embodiments, the green pellets are dried to a moisture content of less than about 18% by weight, or less than about 15% by weight, about 12% by weight, about 10% by weight, about 5% by weight, or about 1% by weight.

After drying and/or calcining, the green pellets are fed to a sintering device 170, in which the green pellets are sintered for a period of time sufficient to enable recovery of sintered, substantially round and spherical particles having one or more of a desired density, bulk density, and crush strength. Alternatively, the pre-sintering device 165 can be eliminated if the sintering device 170 can provide sufficient calcining and/or drying conditions (i.e., drying times and temperatures that dry the green pellets to a target moisture content prior to sintering), followed by sufficient sintering conditions.

The specific time and temperature to be employed for sintering is dependent on the starting ingredients and the desired density for the sintered particles. In some embodiments, sintering device 170 is a rotary kiln, operating at a temperature of from about 1000° C. to about 1600° C., for a period of time from about 5 to about 90 minutes. In certain embodiments, a rotary kiln is operated at a temperature of about 1000° C., about 1200° C., about 1300° C., about 1400° C. or about 1500° C. In certain embodiments, the green pellets have a residence time in the sintering device of from about 50 minutes to about 70 minutes, or from about 30 minutes to about 45 minutes. After the particles exit the sintering device 170, they can be further screened for size, and tested for quality control purposes.

The darkening component can be added at any suitable stage in the system illustrated in FIG. 1. In one or more exemplary embodiments, the darkening component can be introduced to the system illustrated in FIG. 1 at any location prior to, on, or after, the shredder 105, the blunger 110, the tank 115, the heat exchanger 120, the pump system 125, and/or before the fluidizer 130 to provide the ceramic particle.

Figure 2:
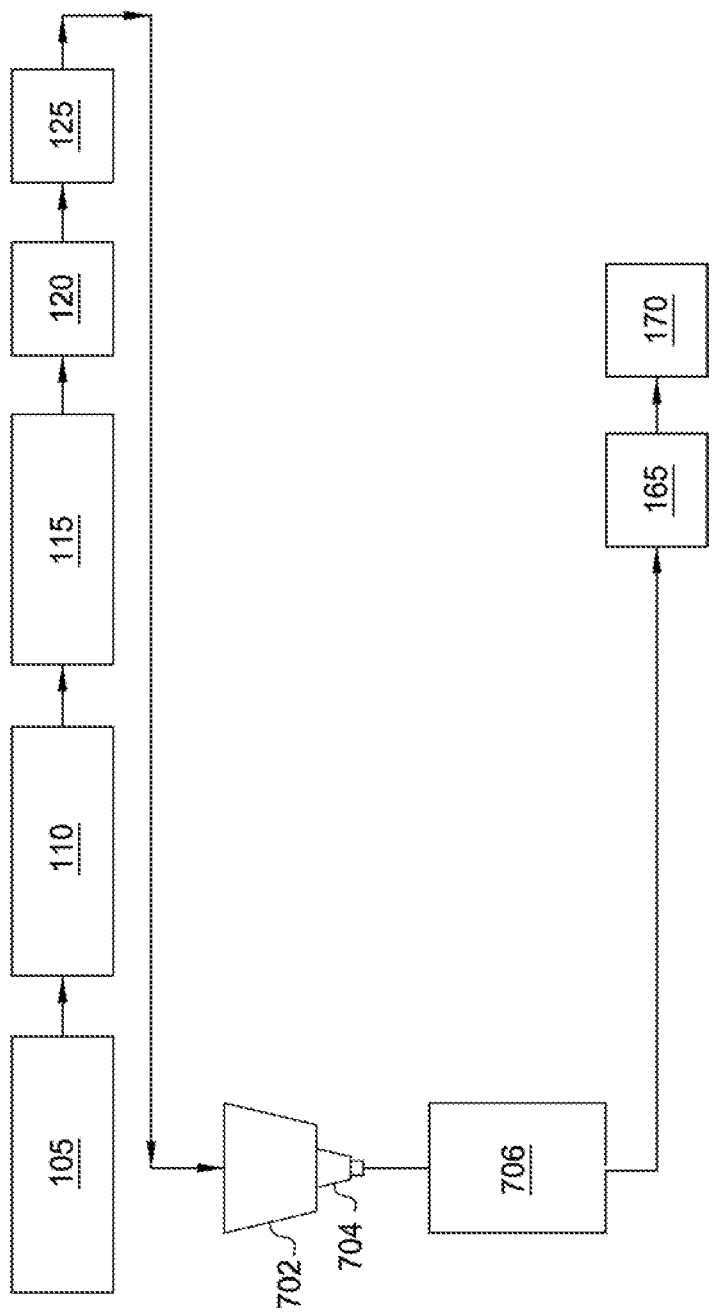
FIG. 2 is a schematic illustration of a drip cast system for preparing ceramic particles from a slurry as described herein.

FIG. 2 is a schematic illustration of a drip cast system for preparing ceramic particles from a slurry as described herein. As shown in FIG. 2, a ceramic raw material is passed through the shredder 105 and fed to the blunger 110 where the ceramic raw material, darkening component, water, dispersant, and/or pH-adjusting reagent can be mixed until a slurry is formed. From the blunger 110, the slurry is fed to the tank 115, where the slurry is continuously stirred and the binder is added. From the tank 115, the slurry is fed to the heat exchanger 120, which heats the slurry to a desired temperature. From the heat exchanger 120, the slurry is fed to the pump system 125, which feeds the slurry to a feed tank 702. A nozzle 704 receives a slurry from the feed tank 704, which contains the ceramic raw materials suspended in water or any other suitable aqueous solution. Pressure applied to feed tank 702 by a pressure supply system (not shown) causes the slurry to flow through nozzle 704 at a selected rate to form droplets. Below nozzle 704 is a coagulation vessel 706, which receives the droplets. A vibrator unit (not shown) is connected to the nozzle 704 and is used to supply pressure pulses to the nozzle or directly in the slurry flowing to the nozzle 704. The resulting vibration of the slurry flow through the nozzle 704 causes the stream exiting the nozzle 704 to break into droplets of uniform size as the droplets fall from the nozzle 704 and into an atmosphere surrounding the nozzle 704. The surrounding atmosphere can include any suitable gaseous medium, such as air or nitrogen. As droplets fall toward coagulation vessel 706, surface tension effects tend to form the droplets into spheres. These falling droplets, or spheres, then contact an upper liquid surface of a coagulation liquid contained in the coagulation vessel 706. The droplets solidify and form into green pellets in the coagulation liquid. The green pellets formed in the coagulation vessel are thus formed without the necessity of a sol-gel reaction, reaction gas free fall zone, foamed layer of reaction liquid or reaction liquid directed onto the droplets prior to entering the reaction liquid bath.

The slurry in the feed tank 702 can have any suitable solids content. The solids content of the slurry can range from about 15%, about 20%, about 25%, or about 35% to about 55%, about 65%, about 75%, or about 85%. In one or more exemplary embodiments, the solids content can be from about 25% to about 75%. The viscosity of the slurry can be from about 1, about 10, about 25, about 50, about 100, or about 250 to about 500, about 750, about 1,000, about 2,500 centipoise (cP) or more. Adjusting the viscosity of the slurry can aid in improving droplet formation and formation of spherical particles. The viscosity of the slurry can be optimized or adjusted via selection of reactant type and/or reactant concentration. Optimization of the dispersant type and concentration can also reduce the viscosity of the slurry. Dispersants can be selected based on cost, availability and effectiveness in reducing the viscosity of a selected slurry. Dispersants that can be used to reduce the viscosity of slurry include sodium silicate, ammonium polyacrylate, sodium polymethacrylate, sodium citrate, sodium polysulfonate and hexametaphosphate.

The slurry in the feed tank 702 can also contain any suitable reactant that will react with a component in coagulation liquid in coagulation vessel 706 to form a semi-solid or insoluble compound. This reactant can be or include a monosaccharide, a disaccharide, a polysaccharide, citric acid, methylcellulose, polyvinyl alcohol, polyvinyl acetate, or borate fluids or any combination or mixture thereof. In one or more exemplary embodiments, the reactant is a polysaccharide, such as sodium alginate. Sodium alginate is a naturally occurring polysaccharide that is soluble in water as the sodium salt but is cross-linked to form a gel as the calcium salt.

In one or more exemplary embodiments, the reactant can be or include any suitable polymer or co-polymer with a divalent exchange mechanism. The reactant can be or include poly(ethylene oxide), ethylene-vinyl acetate copolymers, carboxylic acid polymers and copolymers, acrylate polymers and copolymers, and methacrylate polymers and copolymers. In one or more exemplary embodiments, the reactant can be or include any suitable divalent polymer or co-polymer. In one or more exemplary embodiments, the reactant can be or include poly(maleic acid) (PMA), poly (acrylic acid) (PAA), or any combination thereof. For example, the reactant can be or include a PMA:PAA copolymer.

The slurry can include the reactant in any suitable amounts. The slurry can have a reactant concentration of about 0.01 wt %, about 0.05 wt %, about 0.1 wt %, about 0.25 wt %, about 0.5 wt %, about 0.8 wt %, about 1.2 wt %, or about 1.5 wt % to about 1.8 wt %, about 2 wt %, about 2.5 wt %, about 3 wt %, about 4 wt %, about 5 wt %, about 6 wt %, or about 8 wt %. In one or more exemplary embodiments, the slurry reactant concentration can be from about 0.2 wt % to about 4 wt %, about 0.4 wt % to about 2.8 wt %, about 0.6 wt % to about 2.4 wt %, about 0.8 wt % to about 1.8 wt %, or about 1.2 wt % to about 1.6 wt %.

In certain embodiments, the darkening component is added to the raw material and water in the slurry to result in a darkening component concentration of about 1 ppm, about 10 ppm, about 50 ppm, about 0.01%, about 0.05%, about 0.1%, about 0.5%, or about 1% to about 2%, about 3%, about 5%, about 7.5%, about 10%, about 15%, or about 20% or more by weight of the solids content in the slurry or just prior to the formation of pellets as described below.

Coagulation tank 706 can contain a coagulation liquid which gels the reactant chemical in the slurry. In other words, the coagulation liquid can include any suitable coagulation agent which gels the reactant. The coagulation agent can also be or include any cationic material suitable for ion exchange with the reactant. The coagulation agent can be or include a divalent, trivalent or higher cationic material. In one or more exemplary embodiments, the coagulation agent can be or include one or more salts of calcium, magnesium, strontium, aluminum, and/or iron. For example, the coagulation agent can be or include one or more of calcium chloride, magnesium chloride, or the like. The coagulation liquid can be or include an aqueous solution containing the coagulation agent. The coagulation liquid can have a coagulation agent concentration of about 0.01 wt %, about 0.05 wt %, about 0.1 wt %, about 0.5 wt %, about 1 wt %, about 2 wt %, or about 4 wt % to about 6 wt %, about 8 wt %, about 10 wt %, about 15 wt %, or about 20 wt % or more. In one or more exemplary embodiments, a coagulation liquid for sodium alginate is a calcium chloride solution at concentration levels of 0.5% to 10% by weight.

In one or more exemplary embodiments, the coagulation liquid in the coagulation tank 706 can contain a coagulation agent, a reducing agent and/or the darkening component. In one or more exemplary embodiments, the slurry disclosed herein can also contain a reducing agent and/or the darkening component.

The diameter of nozzle 704, the viscosity of slurry, the ceramic particle content of slurry, pressure to feed the slurry to the nozzle, along with the frequency and amplitude of vibration applied by vibrator source are adjusted to produce droplets having a desired size. These variables are preferably set at a constant value as spheres are produced to be formed into a batch of pellets of propping material. Different batches may be produced having different size pellets. Preferably, each batch will be monosized (i.e., contained on a single sieve such as passing through a 20 mesh sieve but staying on a 25 mesh sieve). The pressure used to feed slurry to the nozzle is adjusted to create laminar flow through the nozzle. The feed pressure can range from 1 to 50 psi. The frequency is adjusted for each set of slurry conditions such that a resonance is established in the slurry stream exiting the nozzle that then produces spherical droplets. The frequency can range from 10 to 20,000 Hz. The pressure and frequency are optimized iteratively to create uniform spherical shapes. The amplitude is adjusted to improve the uniform shape of the spherical droplets formed. The flow rate of the slurry through a nozzle is a function of the nozzle diameter, slurry feed pressure, and the slurry properties such as viscosity and density. For example, for kaolin and alumina slurries through nozzles up to 500 microns in diameter the flow rate per nozzle can range from 0.2 to 3 kg/hr, which equates to a mass flux of about 1 to about 15 kg/(mm² ×hr).

The distance between nozzle 704 and the top of the liquid in coagulation vessel 706 is selected to allow droplets to become spherical before reaching the top of the liquid. The distance can be from 1 to 20 cm, but is more typically in the range of 1 to 5 cm so as to reduce distortion of the droplet shape upon impact with the liquid surface, thereby eliminating the need for a reaction gas, foam layer, or tangentially directed reaction liquid prior to the droplets entering the coagulation vessel 706. The reactant chemical in the droplets of slurry reacts with the coagulation liquid in the coagulation vessel 706 and a semi-solid surface is formed on the droplets, which helps retain the spherical shape and prevents agglomeration of the pellets. Preferably, the residence time of pellets in coagulation vessel 706 is sufficient to allow pellets to become rigid enough to prevent deformation of the spherical shape when they are removed and dried, i.e., semi-rigid. In some embodiments, pellets may fall into a coagulation liquid solution flowing vertically upward so that settling of the particle through the liquid will be retarded to produce a longer residence time in the coagulation vessel 706.

Green pellets formed using the drip cast system of FIG. 2 can be washed to remove excess coagulation agent and conveyed to other devices such as the pre-sintering device 165 and/or the sintering device 170. The darkening component can be added at any suitable stage in the system illustrated in FIG. 2. In one or more exemplary embodiments, the darkening component can be introduced to the system illustrated in FIG. 2, at any location prior to, on, or after, the shredder 105, the blunger 110, the tank 115, the heat exchanger 120, the pump system 125, the feed tank 702, the coagulation vessel 706, the pre-sintering device 165, and/or the sintering device 170 to provide the ceramic particle.

The ceramic particle can have any suitable composition. In one or more exemplary embodiments, the ceramic particle can be or include silica and/or alumina in any suitable amounts. According to several exemplary embodiments, the ceramic particle includes less than 80 wt %, less than 60 wt %, less than 40 wt %, less than 30 wt %, less than 20 wt %, less than 10 wt %, or less than 5 wt % silica based on the total weight of the ceramic particle. According to several exemplary embodiments, the ceramic particle includes from about 0.1 wt % to about 70 wt % silica, from about 1 wt % to about 60 wt % silica, from about 2.5 wt % to about 50 wt % silica, from about 5 wt % to about 40 wt % silica, or from about 10 wt % to about 30 wt % silica. According to several exemplary embodiments, the ceramic particle includes at least about 30 wt %, at least about 50 wt %, at least about 60 wt %, at least about 70 wt %, at least about 80 wt %, at least about 90 wt %, or at least about 95 wt % alumina based on the total weight of the ceramic particle. According to several exemplary embodiments, the ceramic particle includes from about 30 wt % to about 99 wt % alumina, from about 40 wt % to about 95 wt % alumina, from about 50 wt % to about 90 wt % alumina, from about 60 wt % to about 95 wt % alumina, or from about 70 wt % to about 90 wt % alumina.

The ceramic particle can have any suitable darkening component content. In one or more exemplary embodiments, the ceramic particle has a darkening component concentration of about 1 ppmw, about 10 ppmw, about 50 ppmw, about 0.01 wt %, about 0.05 wt %, about 0.1 wt %, about 0.5 wt %, or about 1 wt % to about 2 wt %, about 3 wt %, about 5 wt %, about 7.5 wt %, about 10 wt %, about 15 wt %, or about 20 wt % or more based on the total weight of the ceramic particle. In one or more exemplary embodiments, the ceramic particle has an iron oxide concentration of about 2 ppmw, about 20 ppmw, about 150 ppmw, about 0.05 wt %, about 0.1 wt %, about 0.5 wt %, about 1 wt %, or about 2 wt % to about 4 wt %, about 6 wt %, about 8 wt %, about 10 wt %, about 15 wt %, about 20 wt %, or about 30 wt % or more based on the total weight of the ceramic particle. In one or more exemplary embodiments, the ceramic particle has a MnO concentration of about 1 ppmw, about 10 ppmw, about 50 ppmw, about 0.01 wt %, about 0.05 wt %, about 0.1 wt %, about 0.5 wt %, or about 1 wt % to about 2 wt %, about 3 wt %, about 5 wt %, about 7.5 wt %, about 10 wt %, about 15 wt %, or about 20 wt % or more based on the total weight of the ceramic particle. In one or more exemplary embodiments, the ceramic particle has a $Mn_2O_3$ concentration of about 1 ppmw, about 10 ppmw, about 50 ppmw, about 0.01 wt %, about 0.05 wt %, about 0.1 wt %, about 0.5 wt %, or about 1 wt % to about 2 wt %, about 3 wt %, about 5 wt %, about 7.5 wt %, about 10 wt %, about 15 wt %, or about 20 wt % or more based on the total weight of the ceramic particle.

According to several exemplary embodiments, the ceramic compositions disclosed herein include ceramic particles that are substantially round and spherical having a size in a range between about 6 and 270 U.S. Mesh. For example, the size of the ceramic particle can be expressed as a grain fineness number (GFN) in a range of from about 15 to about 300, or from about 30 to about 110, or from about 40 to about 70. According to such examples, a sample of ceramic particles can be screened in a laboratory for separation by size, for example, intermediate sizes between 20, 30, 40, 50, 70, 100, 140, 200, and 270 U.S. mesh sizes to determine GFN. The correlation between sieve size and GFN can be determined according to Procedure 106-87-S of the American Foundry Society Mold and Core Test Handbook, which is known to those of ordinary skill in the art.

The ceramic particles can have any suitable size. For example, the ceramic particle can have a mesh size of at least about 6 mesh, at least about 10 mesh, at least about 16 mesh, at least about 20 mesh, at least about 25 mesh, at least about 30 mesh, at least about 35 mesh, or at least about 40 mesh. According to several exemplary embodiments, the ceramic particle has a mesh size from about 6 mesh, about 10 mesh, about 16 mesh, or about 20 mesh to about 25 mesh, about 30 mesh, about 35 mesh, about 40 mesh, about 45 mesh, about 50 mesh, about 70 mesh, about 100 mesh, about 140 mesh, about 170 mesh, or about 200 mesh. According to several exemplary embodiments, the ceramic particle has a mesh size from about 4 mesh to about 120 mesh, from about 8 mesh to about 170 mesh, from about 10 mesh to about 60 mesh, from about 16 mesh to about 20 mesh, from about 20 mesh to about 40 mesh, or from about 25 mesh to about 35 mesh.

The ceramic particles disclosed herein can have any suitable shape. The ceramic particles can be substantially round, cylindrical, square, rectangular, elliptical, oval, egg-shaped, or pill-shaped. In one or more exemplary embodiments, the ceramic particles are substantially round and spherical. The ceramic particles can have an average sphericity value of about 0.5 or greater, about 0.7 or greater, about 0.8 or greater, or about 0.9 or greater compared to a Krumbein and Sloss chart. The ceramic particles can have an average roundness value of about 0.5 or greater, about 0.7 or greater, about 0.8 or greater, or about 0.9 or greater compared to a Krumbein and Sloss chart.

The ceramic particles can have any suitable density. The ceramic particles can have a density of at least about 1.5 g/cc, at least about 1.7 g/cc, at least about 1.9 g/cc, at least about 2.1 g/cc, at least about 2.3 g/cc, at least about 2.5 g/cc, at least about 2.7 g/cc, at least about 3 g/cc, at least about 3.3 g/cc, or at least about 3.5 g/cc. In one or more exemplary embodiments, the ceramic particles can have a density of less than 4 g/cc, less than 3.5 g/cc, less than 3 g/cc, less than 2.75 g/cc, less than 2.5 g/cc, or less than 2.25 g/cc. For example, the ceramic particles can have a density of about 1.6 g/cc to about 3.5 g/cc, about 1.8 g/cc to about 3.2 g/cc, about 2.0 g/cc to about 2.7 g/cc, about 2.1 g/cc to about 2.4 g/cc, or about 2.2 g/cc to about 2.6 g/cc.

The ceramic particles can have any suitable bulk density or packing density. In one or more exemplary embodiments, the ceramic particles have a bulk density of less than 3 g/cc, less than 2.5 g/cc, less than 2.2 g/cc, less than 2 g/cc, less than 1.8 g/cc, less than 1.6 g/cc, or less than 1.5 g/cc. The ceramic particles can have a bulk density of about 1 g/cc, about 1.15 g/cc, about 1.25 g/cc, about 1.35 g/cc, or about 1.45 g/cc to about 1.5 g/cc, about 1.6 g/cc, about 1.75 g/cc, about 1.9 g/cc, or about 2.1 g/cc or more. For example, the ceramic particles can have a bulk density of about 1.3 g/cc to about 1.8 g/cc, about 1.35 g/cc to about 1.65 g/cc, or about 1.5 g/cc to about 1.9 g/cc.

The ceramic particles can have any suitable surface roughness measured in accordance with the method disclosed in U.S. Pat. Nos. 8,865,631, 8,883,693, and 9,175, 210. The ceramic particles can have a surface roughness of less than 5 μm, less than 4 μm, less than 3 μm, less than 2.5 μm, less than 2 μm, less than 1.5 μm, or less than 1 μm. For example, the ceramic particles can have a surface roughness of about 0.1 μm to about 4.5 μm, about 0.4 μm to about 3.5 μm, or about 0.8 μm to about 2.8 μm.

Impinging a plurality of the ceramic particles under a gas-entrained velocity onto a flat mild steel target can result in an erosivity of the target material. Impinging the gas-entrained ceramic particles at a velocity of about 160 meters per second (m/s) onto the flat mild steel target can result in an erosivity of about 0.01 milligrams lost from the flat mild steel target per kilogram of proppant contacting the target (mg/kg), about 0.05 mg/kg, about 0.1 mg/kg, about 0.5 mg/kg, about 1 mg/kg, or about 2 mg/kg to about 5 mg/kg, about 7 mg/kg, about 10 mg/kg, about 12 mg/kg, or about 15 mg/kg. Impinging the gas-entrained ceramic particles at a velocity of about 200 m/s onto the flat mild steel target can result in an erosivity of about 0.01 mg/kg, about 0.05 mg/kg, about 0.1 mg/kg, about 0.5 mg/kg, about 1 mg/kg, or about 2 mg/kg to about 5 mg/kg, about 7 mg/kg, about 10 mg/kg, about 12 mg/kg, or about 15 mg/kg. Impinging the gas-entrained ceramic particles at a velocity of about 260 m/s onto the flat mild steel target can result in an erosivity of about 1 mg/kg, about 5 mg/kg, about 10 mg/kg, about 20 mg/kg, about 40 mg/kg, or about 60 mg/kg to about 65 mg/kg, about 70 mg/kg, about 80 mg/kg, about 90 mg/kg, or about 100 mg/kg.

The ceramic particles can have any suitable porosity. The ceramic particles can have an internal interconnected porosity from about 1%, about 2%, about 4%, about 6%, about 8%, about 10%, about 12%, or about 14% to about 18%, about 20%, about 22%, about 24%, about 26%, about 28%, about 30%, about 34%, about 38%, about 45%, about 55%, about 65%, or about 75% or more. In several exemplary embodiments, the internal interconnected porosity of the ceramic particles is from about 5% to about 75%, about 5% to about 15%, about 10% to about 30%, about 15% to about 35%, about 25% to about 45%, about 30% to about 55%, or about 35% to about 70%.

Figure 3:
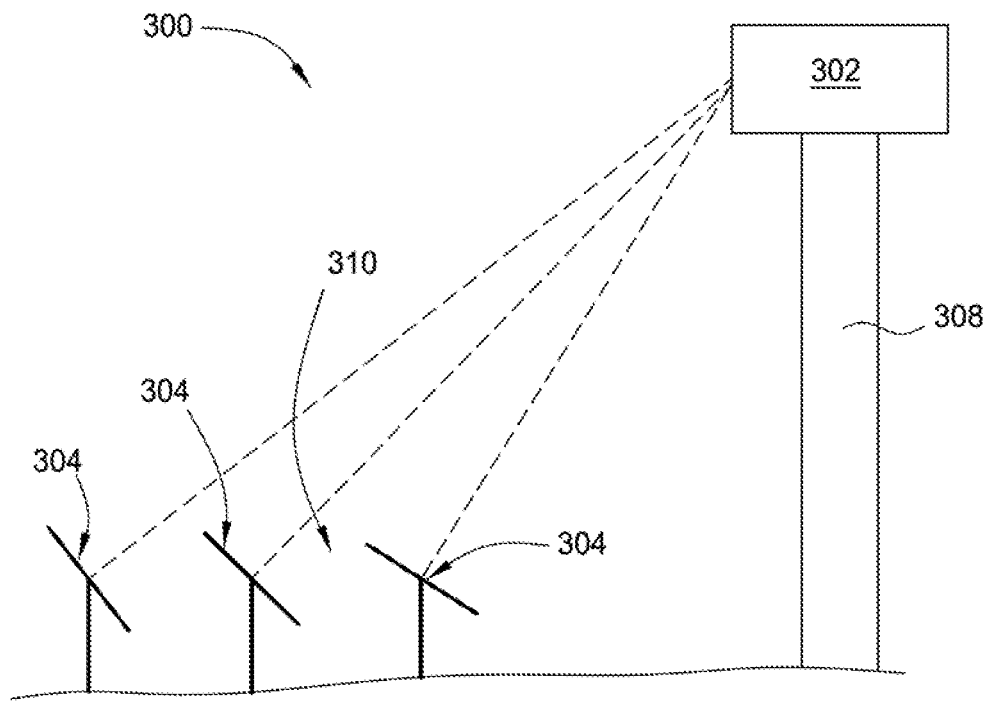
FIG. 3 shows a schematic illustration of an elevation view of a solar power tower in a field of heliostats.

The ceramic particles disclosed herein can be used in any suitable solar power application, such as in a solar power tower. FIG. 3 shows a schematic illustration of an elevation view of a solar power tower 308 in a field of heliostats 310. With reference to FIG. 3, an example of a solar energy-based power generation system 300 can include a solar receiver 302 for receiving solar radiation reflected thereonto by one or more heliostats 304 for the purpose of heating a falling curtain of the ceramic particles disclosed herein located inside the solar receiver 302. The solar receiver 302 can be located at or proximate to the top of a single solar power tower 308, or at some other location, for example (not shown), if an intermediate reflector is used to bounce light received at the top of a tower down to a receiver located at ground level. Solar receiver 302 can include a solid particle process flow loop.

Each heliostat 304 in the field 310 can track the sun so as to reflect light onto the receiver 302 in the tower 308. Heliostats can be arrayed in any suitable manner, for example their spacing and positioning can be selected to provide optimal financial return over a life cycle according to predictive weather data and at least one optimization goal such as total solar energy utilization, energy storage, electricity production, or revenue generation from sales of electricity.

Figure 4:
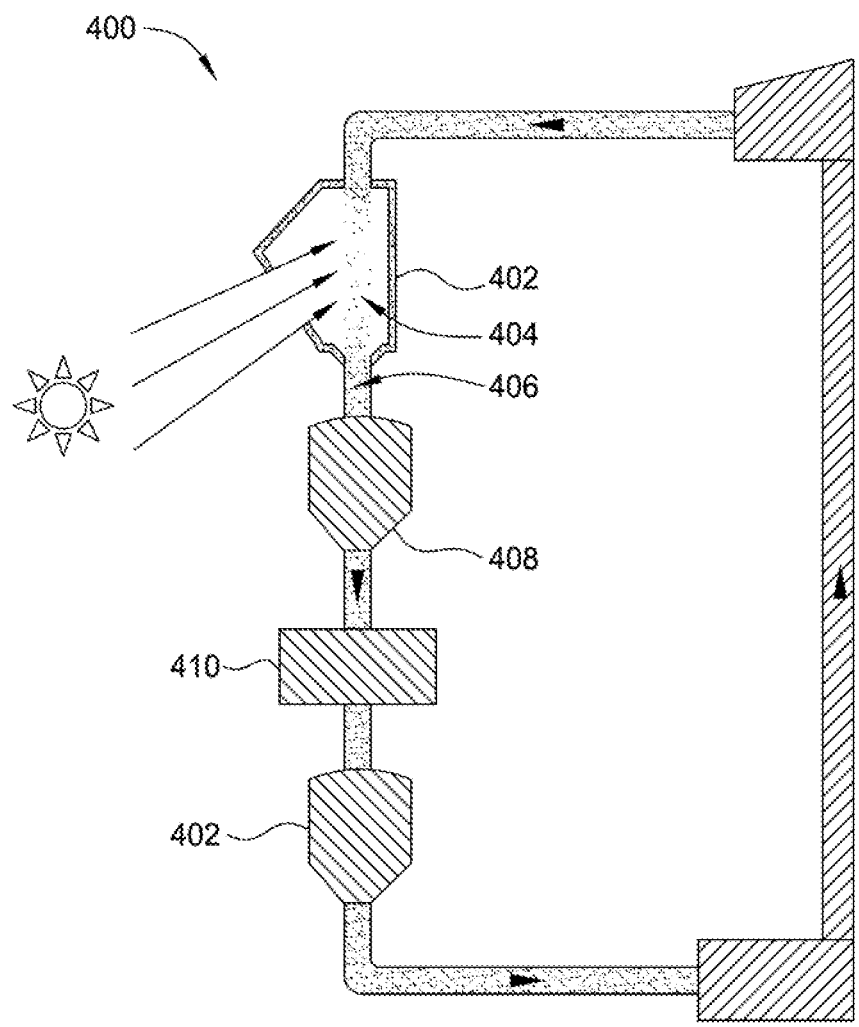
FIG. 4 shows a schematic illustration of a solid particle process flow loop for a solar power tower.

FIG. 4 shows a schematic illustration of a solid particle process flow loop 400 for the solar power tower 308. The solid particle process flow loop 400 can include a solid particle receiver 402 in which solar radiation from the heliostats 304 contact falling ceramic particles 404 to provide heated falling ceramic particles 406. The heated falling ceramic particles 406 can then be collected in a high temperature solids storage vessel 408. The collected ceramic particles can then be directed to one or more heat exchangers 410, such as a direct contact heat exchanger, in which the heat trapped in the collected ceramic particles can be transferred to a heat exchange medium to provide cooled ceramic particles. The cooled ceramic particles can be collected in one or more low temperature solids storage vessels and then can be recycled to the solid particle receiver 402.

After exposure to heat in the solar power tower 308, the MnO present in the ceramic particles can darken by shifting from $Mn^{2+}$ to $Mn^{3+}$, resulting in darkened ceramic particles. A cumulative exposure of solar heat energy in the solar power tower 308, for example at a temperature of about 100° C., about 200° C., about 300° C., or about 400° C. to about 600° C., about 700° C., about 800° C., or about 1,000° C. or more for about 10 hours to about 10,000 hours, about 50 hours to about 5,000 hours, or from about 250 hours to about 2,500 hours, can darken the ceramic particles by any suitable amount. The cumulative exposure of solar heat energy to the ceramic particles in the solar power tower 308 can darken the ceramic particles to produce darkened ceramic particles having a Munsell Value of less than 7, less than 6, less than 5, or less than 4 based on the Munsell Color System found in the Munsell Book of Color. "Value", or "lightness", varies vertically along the color solid, from black (value 0) at the bottom, to white (value 10) at the top of the vertical axis of the Munsell Color System. Neutral grays lay along the vertical axis between black and white. In one or more exemplary embodiments, subjecting the MnO containing ceramic particles to the cumulative exposure of solar heat energy in the solar power tower 308 can reduce the Munsell Value of the ceramic particles from greater than 6, greater than 5, or greater than 4 to less than 5, less than 4, or less than 3. Exposure of the MnO containing ceramic particles to solar heat energy in the solar power tower 308 can reduce a Munsell Value of the ceramic particle by at least about 0.1, at least about 0.3, at least about 0.5, at least about 0.7, or at least about 1. For example, subjecting the MnO containing ceramic particles to the cumulative exposure of solar heat energy in the solar power tower 308 can reduce the Munsell Value of the ceramic particles by about 0.1, about 0.3, about 0.5, about 0.7, or about 1 to about 1.2, about 1.5, about 2, or about 2.5 or more.

In one or more exemplary embodiments, the ceramic particles can contain FeO and MnO. After exposure to solar heat energy in the solar power tower 308, the FeO present in the ceramic particles can lighten by shifting from $Fe^{2+}$ to $Fe^{3+}$, while the MnO present in the ceramic particles can darken by shifting from $Mn^{2+}$ to $Mn^{3+}$, which can result in ceramic particles having a stable, or substantially unchanged, Munsell Value after the cumulative exposure to heat in the solar power tower 308. For example, the Munsell Value of the FeO and MnO containing ceramic particles can be less than 6, less than 5, less than 4, or less than 3 before and/or after subjecting the ceramic particles to the cumulative exposure of solar heat energy in the solar power tower 308. Exposure of the ceramic particles containing both MnO and FeO to solar heat energy in the solar power tower 308 can reduce a Munsell Value of the ceramic particle by at least about 0.1, at least about 0.3, at least about 0.5, at least about 0.7, or at least about 1. For example, subjecting the ceramic particles containing both FeO and MnO to the cumulative exposure of solar heat energy in the solar power tower 308 can reduce the Munsell Value of the ceramic particles by about 0.1, about 0.3, about 0.5, about 0.7, or about 1 to about 1.2, about 1.5, about 2, or about 2.5 or more.

While the present disclosure has been described in terms of several exemplary embodiments, those of ordinary skill in the art will recognize that embodiments of the present disclosure can be practiced with modification within the spirit and scope of the appended claims.

The present disclosure has been described relative to a several exemplary embodiments. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the present disclosure will be employed without a corresponding use of other features. Accordingly, it is appropriate that the appended claims be construed broadly and in a manner consistent with the scope of the present disclosure.

What is claimed is:

1. A ceramic particle for use in a solar power tower, comprising:
  a sintered ceramic material formed from a mixture of a ceramic raw material and MnO, the ceramic particle having a size from about 8 mesh to about 170 mesh and a bulk density of less than 3 g/cc, wherein the sintered ceramic material comprises $Mn_2O_3$ and $Fe_2O_3$, wherein the ceramic raw material comprises from about 0.1 wt % to about 50 wt % silica and from about 30 wt % to about 99 wt % alumina.

2. The ceramic particle of claim 1, wherein the ceramic particle has a surface roughness of less than 5 μm.

3. The ceramic particle of claim 1, further comprising a spherical shape.

4. The ceramic particle of claim 3, wherein exposure of the ceramic particle to solar heat energy in the solar power tower reduces a Munsell Value of the ceramic particle by at least about 0.1.

5. A solar power tower comprising the ceramic particle of claim 1.

6. A ceramic particle for use in a solar power tower, comprising:
  a sintered ceramic material formed from a mixture of a ceramic raw material and MnO, the ceramic particle having a size from about 8 mesh to about 170 mesh and a bulk density of less than 3 g/cc, wherein the sintered ceramic material comprises $Mn_2O_3$ and $Fe_2O_3$, wherein the mixture further comprises about 0.1 wt % to about 20 wt % FeO.

7. A method of manufacturing ceramic particles, comprising:
  preparing a slurry comprising water, a binder, a first portion of a ceramic raw material, and manganese oxide;
  atomizing the slurry into droplets;
  coating seeds comprising a second portion of the ceramic raw material with the droplets to form a plurality of green pellets; and
  sintering the green pellets to provide a plurality of ceramic particles, wherein the sintering oxidizes a first portion of the manganese oxide from MnO to $Mn_2O_3$.

8. The method of claim 7, wherein the ceramic raw material comprises from about 0.1 wt % to about 50 wt % silica and from about 30 wt % to about 99 wt % alumina.

9. The method of claim 7, wherein a second portion of the manganese oxide is oxidized from MnO to $Mn_2O_3$ upon being subjected to solar heat energy in a solar power tower.

10. The method of claim 7, wherein the slurry further comprises about 0.1 wt % to about 20 wt % iron oxide.

11. The method of claim 10, wherein the sintering oxidizes a first portion of the iron oxide from FeO to $Fe_2O_3$.

12. The method of claim 11, wherein a second portion of the iron oxide is oxidized from FeO to $Fe_2O_3$ upon being subjected to solar heat energy in a solar power tower.

13. The method of claim 7, wherein the plurality of ceramic particles has a Munsell value of at least 6 prior to exposure to solar heat energy in a solar power tower.

14. The method of claim 13, wherein the plurality of ceramic particles has a Munsell value of less than 6 after exposure to the solar heat energy in the solar power tower.

15. A method of manufacturing ceramic particles, comprising:
   providing a slurry of ceramic raw material, a reactant and MnO, wherein the ceramic raw material comprises from about 0.1 wt % to about 50 wt % silica and from about 30 wt% to about 99 wt % alumina;
   flowing the slurry through a nozzle in a gas while vibrating the slurry to form droplets;
   receiving the droplets in a vessel containing a liquid having an upper surface, the liquid containing a coagulation agent;
   reacting the reactant with the coagulation agent to cause coagulation of the reactant in the droplets;
   transferring the droplets from the liquid;
   drying the droplets to form green pellets;
   sintering the green pellets in a selected temperature range to form a plurality of ceramic particles, wherein the sintering oxidizes a first portion of the MnO to $Mn_2O_3$.

16. The method of claim 15, wherein a second portion of the MnO is oxidized to $Mn_2O_3$ upon being subjected to solar heat energy in a solar power tower.

17. A method of manufacturing ceramic particles, comprising:
   providing a slurry of ceramic raw material, a reactant and MnO, wherein the slurry further comprises about 0.1 wt % to about 20 wt % iron oxide;
   flowing the slurry through a nozzle in a gas while vibrating the slurry to form droplets;
   receiving the droplets in a vessel containing a liquid having an upper surface, the liquid containing a coagulation agent;
   reacting the reactant with the coagulation agent to cause coagulation of the reactant in the droplets;
   transferring the droplets from the liquid;
   drying the droplets to form green pellets;
   sintering the green pellets in a selected temperature range to form a plurality of ceramic particles, wherein the sintering oxidizes a first portion of the MnO to $Mn_2O_3$.

18. The method of claim 17, wherein the sintering oxidizes a first portion of the iron oxide from FeO to $Fe_2O_3$.

19. The method of claim 18, wherein a second portion of the iron oxide is oxidized from FeO to $Fe_2O_3$ upon being subjected to solar heat energy in a solar power tower.

\* \* \* \* \*